United States Patent
Vemulapalli et al.

(10) Patent No.: US 11,163,987 B2
(45) Date of Patent: *Nov. 2, 2021

(54) COMPACT LANGUAGE-FREE FACIAL EXPRESSION EMBEDDING AND NOVEL TRIPLET TRAINING SCHEME

(71) Applicant: Google LLC, Mountain View, CA (US)

(72) Inventors: Raviteja Vemulapalli, Seattle, WA (US); Aseem Agarwala, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,439

(22) Filed: Jan. 15, 2020

(65) Prior Publication Data

US 2020/0151438 A1    May 14, 2020

Related U.S. Application Data

(63) Continuation of application No. 15/639,086, filed on Jun. 30, 2017, now Pat. No. 10,565,434.

(51) Int. Cl.
*G06K 9/00*    (2006.01)
*G06N 20/00*    (2019.01)
(Continued)

(52) U.S. Cl.
CPC ..... *G06K 9/00295* (2013.01); *G06K 9/00302* (2013.01); *G06K 9/4628* (2013.01);
(Continued)

(58) Field of Classification Search
CPC ............ G06K 9/00295; G06K 9/4628; G06K 9/00302; G06K 9/6282; G06N 20/00; G06N 3/04
See application file for complete search history.

(56) References Cited

U.S. PATENT DOCUMENTS 10,289,076 B2 *  5/2019  Kim ..................... G06N 3/0445
10,565,434 B2 *  2/2020  Vemulapalli ......... G06K 9/4628
(Continued)

FOREIGN PATENT DOCUMENTS

| CN | 102890776 A | 1/2013 |
| KR | 101854431 | 5/2018 |
| WO | WO 2016/100717 | 6/2016 |

OTHER PUBLICATIONS

Guo, Yanan "Deep Neural Networks with Relativity Learning for Facial Expression Recognition" 2016 IEEE International Conference on Multimedia and Expo Workshops. (Year: 2016).*

(Continued)

*Primary Examiner* — Kim Y Vu
*Assistant Examiner* — Molly Delaney
(74) *Attorney, Agent, or Firm* — Dority & Manning, P.A.

(57) ABSTRACT

The present disclosure provides systems and methods that include or otherwise leverage use of a facial expression model that is configured to provide a facial expression embedding. In particular, the facial expression model can receive an input image that depicts a face and, in response, provide a facial expression embedding that encodes information descriptive of a facial expression made by the face depicted in the input image. As an example, the facial expression model can be or include a neural network such as a convolutional neural network. The present disclosure also provides a novel and unique triplet training scheme which does not rely upon designation of a particular image as an anchor or reference image.

20 Claims, 11 Drawing Sheets

(51) Int. Cl.
G06K 9/46 (2006.01)
G06K 9/62 (2006.01)
G06N 3/04 (2006.01)

(52) U.S. Cl.
CPC ........... *G06N 20/00* (2019.01); *G06K 9/6282* (2013.01); *G06N 3/04* (2013.01)

(56) References Cited

U.S. PATENT DOCUMENTS

| | | | | |
|---|---|---|---|---|
| 2011/0025689 A1* | 2/2011 | Perez | ................. | A63F 13/213 345/420 |
| 2012/0191460 A1* | 7/2012 | Ng-Thow-Hing | ...... | G10L 21/10 704/272 |
| 2016/0114488 A1* | 4/2016 | Mascorro Medina | ....................... | B25J 11/008 700/259 |
| 2018/0260665 A1* | 9/2018 | Zhang | .................. | G06K 9/6276 |
| 2019/0095464 A1* | 3/2019 | Xie | ..................... | G06K 9/6272 |

OTHER PUBLICATIONS

Partial Search Report with Provisional Opinion from PCT/US2018/022308 dated Jul. 5, 2018, 9 pages.

Guo et al., "Deep Neural Networks with Relativity Learning for Facial Expression Recognition", Institute of Electrical and Electronics Engineers International Conference on Multimedia and Expo Workshops, Seattle, Washington, Jul. 11-15, 2016, 6 pages.

Hinton et al., "Stochastic Neighbor Embedding", Advances in Neural Information Processing Systems, 2003, pp. 833-840.

Huang et al., "Facial Expression Recognition Using Stochastic Neighbor Embedding and SVMs", International Conference on System Science and Engineering, Macao, China, Jun. 8-10, 2011, 9 pages.

International Search Report and Written Opinion for PCT/US2018/022308 dated Sep. 10, 2018, 18 pages.

Pal et al., "Facial Expression Recognition Based on Basic Expressions and Intensities Using K-Means Clustering", International Journal of Science and Research, vol. 5, Issue 2, Feb. 2016, pp. 1949-1952.

Schroff et al., "FaceNet: A Unified Embedding for Face Recognition and Clustering", arXiv:1503.03832v3, Jun. 17, 2015, 10 pages.

Wang et al., "Emotion Detection via Discriminant Laplacian Embedding", Universal Access in the Information Society, vol. 13, Issue 1, Mar. 2014, pp. 23-31.

Wang et al., "Learning Fine-Grained Image Similarity with Deep Ranking", arXiv:1404.4661v1, Apr. 17, 2014, 8 pages.

* cited by examiner

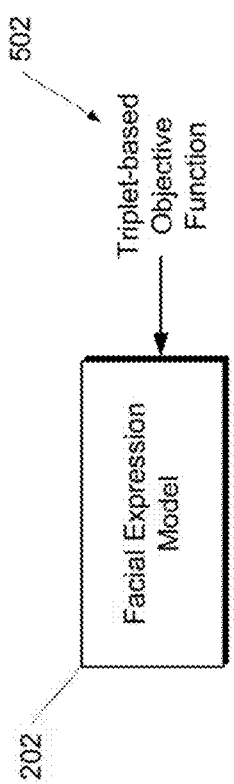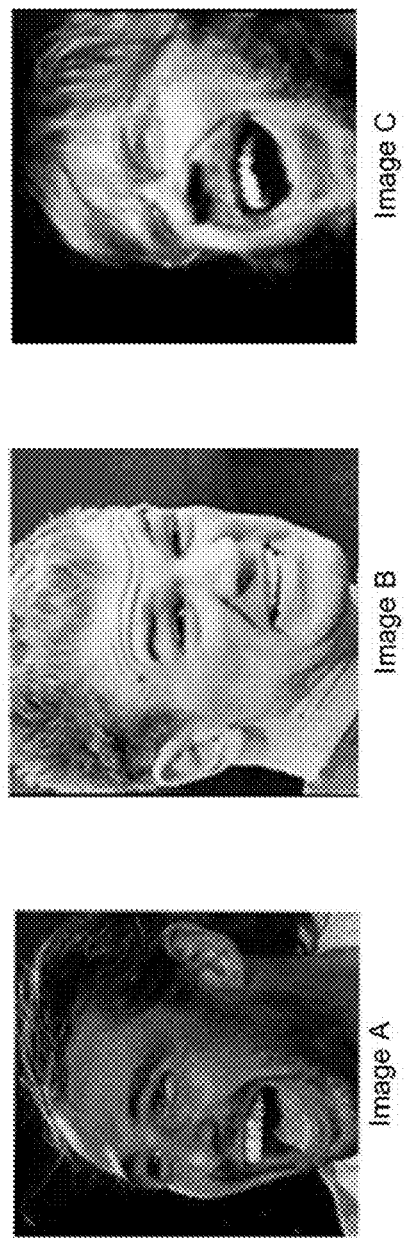
Figure 5A
Figure 5B
Select the pair of images that depict the most similar facial expressions.

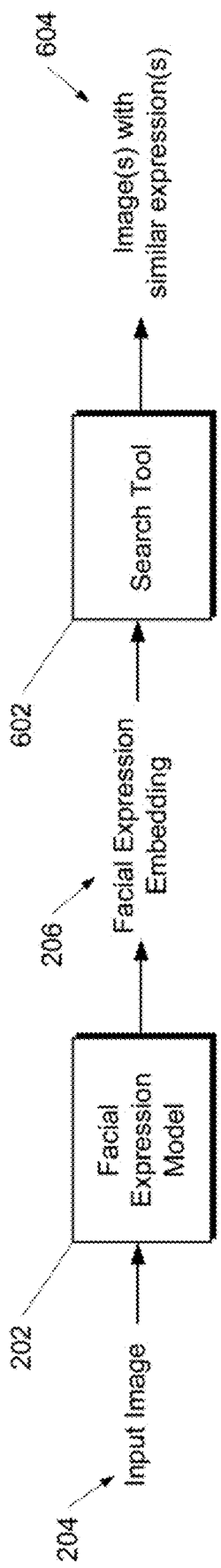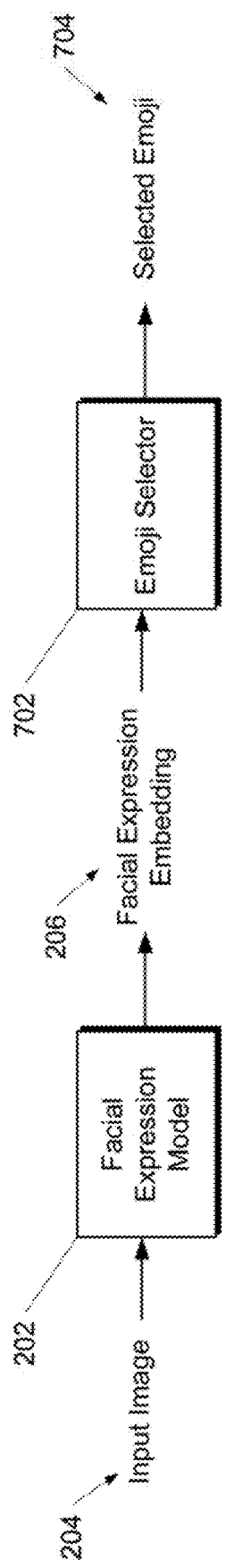

COMPACT LANGUAGE-FREE FACIAL EXPRESSION EMBEDDING AND NOVEL TRIPLET TRAINING SCHEME

PRIORITY CLAIM

The present application is a continuation of U.S. application Ser. No. 15/639,086 having a filing date of Jun. 30, 2017. Applicant claims priority to and the benefit of each of such applications and incorporate all such applications herein by reference in its entirety.

FIELD

The present disclosure relates generally to machine learning. More particularly, the present disclosure relates to compact language-free facial expression embeddings and associated novel triplet training techniques.

BACKGROUND

Machine learning generally refers to a field of computer science that is focused on enabling machines such as computers to learn without being explicitly programmed. Machine learning includes the study and construction of machine-performed algorithms or techniques that enable machines to learn from and make predictions on data. In particular, such algorithms can operate by building a model from a training set of input observations in order to make data-driven predictions or decisions expressed as outputs, rather than following strictly static programming instructions.

One main branch of machine learning techniques includes supervised learning techniques. Supervised learning can include inferring or learning a function or model from a training data set that includes a number of labeled examples. For example, each example in the training data set can include one or more input values (which can be expressed as a vector with a number of features, as a two dimensional matrix, or in other formats) and one or more desired output values (which can also be called supervisory signals). Typically, supervised training data is labeled using known ground truth information that provides the input values and the output values. A supervised machine learning algorithm can analyze the training data and produce an inferred model, which can then be used for mapping or making predictions on new, unlabeled examples.

However, in many scenarios, labeled data and/or ground truth data can be difficult and/or costly to obtain. For example, manual labeling of data can require a human to determine and provide a large amount of labels to an enormous number of training examples, which can require an inordinate amount of time and expense. In addition, providing manual labels can be conceptually challenging because, in some instances, the human labeler(s) can be required to agree ahead of time exactly what labels are available for use. Even assuming agreement on the vocabulary of available labels, labelers may not agree on which label to apply or how or when to apply the label to a given training example.

SUMMARY

Aspects and advantages of embodiments of the present disclosure will be set forth in part in the following description, or can be learned from the description, or can be learned through practice of the embodiments.

One example aspect of the present disclosure is directed to a computer system. The computer system includes a facial expression model configured to receive an input image that depicts a face and, in response, provide a facial expression embedding that encodes information descriptive of a facial expression made by the face depicted in the input image. The computer system includes one or more processors and one or more non-transitory computer-readable media that store instructions that, when executed by the one or more processors, cause the computer system to: obtain the input image that depicts the face; input the input image into the facial expression model; and receive the facial expression embedding that encodes information descriptive of the facial expression made by the face from the facial expression model.

Another example aspect of the present disclosure is directed to a computer-implemented method for training a facial expression model. The method includes receiving training data that includes plural triplets of images that depict faces and similarity information corresponding to each triplet. The similarity information for each triplet indicates which two images of such triplet have been determined to be the most similar pair of images in terms of facial expressions. None of the images is indicated to be a reference image against which the other two images of the triplet have been compared. The method includes training the facial expression model using the training data such that a distance in an embedding space between the most similar pair of images is less than respective distances between each image of the pair and the third image of the triplet.

As an example, in some implementations, training the facial expression model using the training data can include training the facial expression model using the training data such that the distance in the embedding space between the most similar pair of images is less than respective distances between each image of the pair and the third image of the triplet by at least a margin.

Another example aspect of the present disclosure is directed to one or more non-transitory computer-readable media that collectively store instructions that, when executed by one or more processors, cause the one or more processors to perform operations. The operations include training a facial expression model to provide language-free facial expression embeddings descriptive of facial expressions made by faces included in input images. Training the facial expression model includes obtaining a training dataset that includes a plurality of images organized into triplets of images. Each triplet of images has a label that indicates that a first image and a second image included in such triplet of images have been assessed to be a most similar pair of images within such triplet of images. Training the facial expression model includes training the facial expression model using an objective function that encodes both a first constraint and a second constraint. For each triplet of images, the first constraint includes a first requirement that a first distance between a first embedding provided for the first image by the facial expression model and a second embedding provided for the second image by the facial expression model is less than a second distance between the first embedding and a third embedding provided by the facial expression model for a third image included in such triplet of images. For each triplet of images, the second constraint includes a second requirement that the first distance between the first embedding and the second embedding is less than a third distance between the second embedding provided for the second image by the facial expression model and the third embedding provided for the third image by the facial expression model.

As an example, in some implementations, for each triplet of images, the first constraint can include a first requirement that the first distance between the first embedding provided for the first image by the facial expression model and the second embedding provided for the second image by the facial expression model is less than by at least a first margin the second distance between the first embedding and the third embedding provided by the facial expression model for the third image included in such triplet of images. Likewise, in some implementations, for each triplet of images, the second constraint can include a second requirement that the first distance between the first embedding and the second embedding is less than by at least a second margin the third distance between the second embedding provided for the second image by the facial expression model and the third embedding provided for the third image by the facial expression model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 5A-B depict an example training scheme according to example embodiments of the present disclosure.

FIG. 6 depicts an example use of a facial expression embedding according to example embodiments of the present disclosure.

FIG. 7 depicts an example use of a facial expression embedding according to example embodiments of the present disclosure.

Figure 1A:
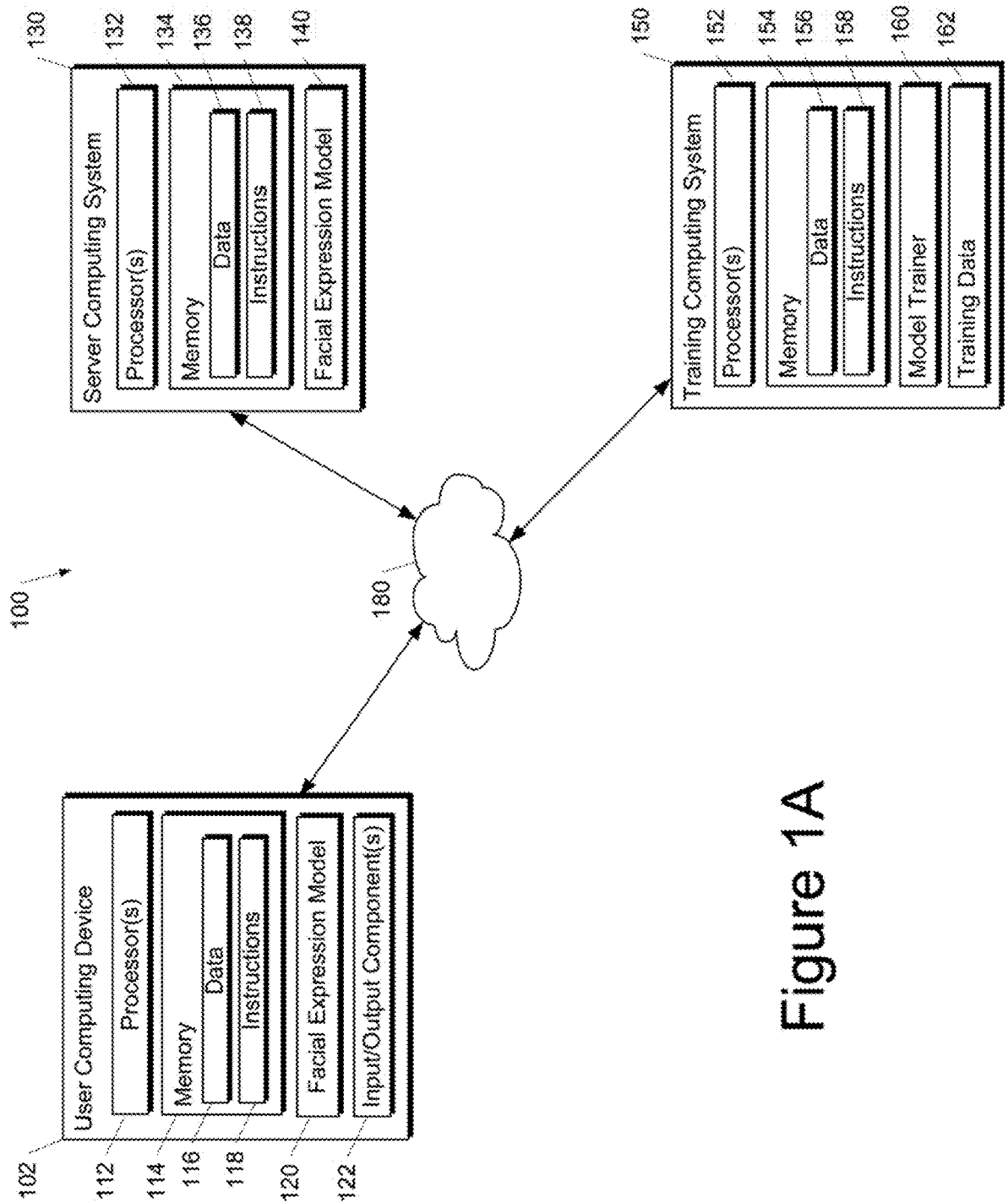
FIG. 1A depicts a block diagram of an example computing system according to example embodiments of the present disclosure.

Reference numerals that are repeated across plural figures are intended to identify the same components or features in various implementations.

DETAILED DESCRIPTION

Overview

Generally, the present disclosure is directed to systems and methods that include or otherwise leverage use of a facial expression model that is configured to provide a facial expression embedding. In particular, the facial expression model can receive an input image that depicts a face and, in response, provide a facial expression embedding that encodes information descriptive of a facial expression made by the face depicted in the input image. As an example, the facial expression model can be or include a neural network such as a convolutional neural network.

According to an aspect of the present disclosure, in some implementations, the facial expression embedding can be a language-free embedding. In particular, in some implementations, the facial expression embedding can be or include an embedding vector that contains a plurality of numerical values respectively for a plurality of embedding dimensions (e.g., 16 embedding dimensions). Thus, the facial expression embedding can provide a numerical encoding of facial expression information that does not rely upon human language concepts of facial expression (e.g., "smile," "frown," etc.) but instead lies within a continuous and universal numerical spectrum of embedding space.

As such, the facial expression embedding resolves a common problem associated with classification of facial expressions based on language-based categories, which is the requirement of a priori agreement on a shared and inherently limiting dictionary of facial expression categories. Furthermore, due to the continuous nature of the embedding space, the facial expression model and corresponding embeddings can encode a much more complex and subtle understanding of the facial expression. As an example, the facial expression model and corresponding embeddings can differentiate between nuanced expressions such as a forced smile and a genuine smile. This continuous spectrum nature of the facial expression model is also in contrast to facial recognition models which are inherently based on a number of discrete categories (e.g., identities).

The facial expression embedding can be useful for a number of different uses, including, for example, determining a measure of similarity between two facial expressions made by different faces in respective images. In particular, a similarity between the respective facial expression embeddings can be indicative of a similarity between the respective facial expressions. Likewise, a dis-similarity between the embeddings can indicate a dis-similarity between the facial expressions. In one example, a similarity or relatedness between facial expressions can be determined by calculating a Euclidean distance (e.g., in a dimension-wise fashion) between their respective embedding vectors as provided by the facial expression model. Such can be useful for performing, among other applications, an expression similarity search.

In addition, the facial expression information encoded by the facial expression embedding is generally abstracted or otherwise divorced from an identity of the person making the facial expression. Thus, expressions can be compared across different persons, irrespective of the identity of the person(s) making the expression. Such is in contrast to more commonly used facial recognition models (e.g., facial recognition neural networks) which focus on using embeddings to identify images of a same person, irrespective of facial expression.

According to another aspect of the present disclosure, the facial expression model can be trained to provide facial expression embeddings that reflect or otherwise mimic human perception or opinions. For example, in some implementations, the facial expression model can be trained on training data that includes humanly applied labels, thereby providing embeddings that mimic or otherwise reflect human perceptions or opinions regarding facial expressions.

In particular, according to an aspect of the present disclosure, the facial expression model can be trained according to a triplet training scheme, in which triplets of images are used to train the model. More particularly, training models such as neural networks (e.g., convolutional neural networks) to perform face (or any other object) recognition can be performed by labelling images of a triplet of images. Specifically, in certain existing techniques one of the images is labelled as a reference image (also sometimes referred to as an anchor or query image) against which the other two images have been compared. The other two images are then labelled as positive or negative, with a positive label indicating that the face/object in the image matches the face/object in the reference image and a negative label indicating that the face/object in the image does not match the face/object in the reference image.

Although this approach can be effective for identification of characteristics of a subject of an image which vary in a discrete manner, e.g., the identity or the type/class of the subject, it may be less effective when the characteristic does not vary discretely. Such non-discretely varying characteristics include facial expressions, which, since they may include many subtle differences, may not be easy to categorize into any one category. Furthermore, as is generally the case for all humanly-applied data labelling, collection of labels for the training data can require a significant expenditure of time and/or financial expense.

As such, according to another aspect of the present disclosure, the facial expression model can be trained using a novel and unique triplet training scheme which, in contrast to the triplet training schemes described immediately above, does not rely upon designation of a particular image as an anchor or reference image. Specifically, training data can include plural triplets of images and similarity information corresponding to each triplet. The similarity information for each triplet can indicate which two images of the triplet have been determined to be the most similar pair of images within such triplet. For example, the similarity information can include one or more labels that have been applied by human reviewers, where the one or more labels indicate which two images of the triplet the human reviewer assessed to be most similar.

Unlike the above-described conventional approach, none of the images is indicated to be a reference image against which the other two images of the triplet have been compared. Instead, any two of the images of the triplet may have been determined to be the most similar. This is not the case in the conventional approach in which it is not possible for the two non-reference images to have been determined to be the most similar.

The facial expression model can then be trained using this training data. For example, according to another aspect of the present disclosure, in some implementations, the facial expression model can be trained such that a distance in the embedding space between the embeddings of the most similar pair of images is less than respective distances between the embeddings of each image of the pair and the third image of the triplet. In particular, in some implementations, the facial expression model can be trained such that the distance in the embedding space between the most similar pair of images is less than respective distances between each image of the pair and the third image of the triplet by at least a margin.

As an example of the above-described concept, in some implementations, the facial expression model can be trained using an objective function that encodes both a first constraint and a second constraint. For each triplet of images, the first constraint can include a first requirement that a first distance between a first embedding provided for a first image of the pair of most similar images and a second embedding provided for a second image of the pair of most similar images is less than (e.g., by at least a first margin) a second distance between the first embedding and a third embedding provided by the facial expression model for a third image (e.g., the image not included in the pair of most similar images). Likewise, for each triplet of images, the second constraint can include a second requirement that the first distance between the first embedding and the second embedding is less (e.g., by at least a second margin) than a third distance between the second embedding provided for the second image by the facial expression model and the third embedding provided for the third image by the facial expression model. For example, each distance between embeddings can be a Euclidian distance between such embeddings. The first margin can be the same as or different than the second margin. The first margin and/or the second margin can be zero or can be non-zero (e.g., positive real number).

Since the similarity information indicates a most similar pair of images rather than whether or not a certain characteristic of an image is most similar to a characteristic of a reference image, non-discretely (or continuously) varying characteristics may be recognized more accurately. This may be at least in part because the similarity information may provide more information than is offered by the conventional labelling approach. This is because it indicates a) that a first image is most similar to a second image, b) that a third image is less similar to the first image than is the second image, and c) that the third image is less similar to the second image than is the first image. In contrast, the conventional labelling approach only indicates that the positive image is more similar to the reference image than is the negative image.

Thus, in effect, the novel anchor-free labelling scheme provided by the present disclosure provides two judgments for each triplet of images, while the more conventional labelling approach provides only a single judgment. Thus, the novel anchor-free labelling scheme described herein doubles the usefulness of each instance of humanly-performed labelling. Thus, the significant expenditure of time and/or financial expense associated with collection of humanly-applied labels can be reduced by half.

In addition to the above, because there is no requirement for the image triplets to include two images that match and one which does not, the processing involved with selecting the image triplets may be reduced. For example, any three arbitrary images can be used to provide useful training information, while still reflecting human perceptions. Stated differently, using the conventional approach, an initial review would need to be performed to ensure that the anchor image was, in fact, included within the most similar pair of images. However, with the novel training scheme described herein, there is no requirement for this initial review, as the human labeler is free to select any two of the three images as the most similar pair. Thus, in this fashion, expenditure of time and/or financial expense can be further reduced.

Furthermore, because the image triplets may be uncategorized, the training method may be language independent, which may avoid any problems (e.g., increased error) associated with discrepancies between meanings of particular category labels in different languages.

Accurate identification of facial expressions may have many uses. For instance, it may be used for determining an emotional state or emotional response of a subject, understanding human deception, and lie detection. It may also facilitate improved human-machine interaction since it may enable the machine to detect unspoken emotions, thoughts or commands and to react accordingly.

Additional example uses for which the systems and methods of the present disclosure can employ the facial expression embeddings described herein include: searching for image(s) that depict other face(s) making similar expression(s); converting an image of a human facial expression into a cartoon (e.g., emoji) that has the same facial expression; summarizing photograph or other image collections; as a feature or consideration in curating images; puppetry; and/or face synthesis. These and other example use cases will be discussed in greater detail below.

Furthermore, although the novel triplet training technique described by the present disclosure is discussed with particular reference to a facial expression model, the triplet training technique described herein is more broadly applicable and is useful to train a model to provide an embedding that is descriptive of any number of different characteristics (e.g., beyond facial expressions) exhibited by any number of different types or mediums of input data (e.g., beyond imagery). Thus, the triplet training technique can be applied to any form of training data having any different attribute or characteristic to enable a model to provide a language-free embedding descriptive of such attribute or characteristic within a continuous embedding space. In addition, as recognized above, the triplet training technique described herein has particular applicability and usefulness when applied to characteristics or attributes which are continuous in nature.

To provide one example application of the novel triplet training technique beyond the context of facial expressions, human reviewers could be provided with triplets of sounds and requested to select the pair of sounds in each triplet that are most similar to each other. A sound embedding model can be trained—using the labelled triplets and/or the example objective functions described herein—to provide a language-free sound embedding descriptive of an input sound. Such sound embedding could be used for a number of different uses including, for example, to identify sounds that are similar (as evidenced by their similar embeddings) to the input sound. Sound is provided as one example characteristic only. Many other characteristics could be used, including, as examples, color, artwork, hairstyle, patterns, writing style, visual appearance of various types, operating parameters or status indicated by sensor data, etc.

With reference now to the Figures, example embodiments of the present disclosure will be discussed in further detail.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more facial expression models 120. For example, the facial expression models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, convolutional neural networks, or other forms of neural networks. Alternatively or additionally, the facial expression models 120 can include other forms of machine-learned models. Example facial expression models 120 and training schemes therefor are discussed with reference to FIGS. 2-5B.

In some implementations, the one or more facial expression models 120 can be received from the server computing system 130 over network 180, stored in the user computing device memory 114, and then used or otherwise implemented by the one or more processors 112. In some implementations, the user computing device 102 can implement multiple parallel instances of a facial expression model 120 (e.g., to perform multiple parallel instances of facial expression embedding generation).

Additionally or alternatively, one or more facial expression models 140 can be included in or otherwise stored and implemented by the server computing system 130 that communicates with the user computing device 102 according to a client-server relationship. For example, the facial expression models 140 can be implemented by the server computing system 140 as a portion of a web service (e.g., a facial expression search service). Thus, one or more models 120 can be stored and implemented at the user computing device 102 and/or one or more models 140 can be stored and implemented at the server computing system 130.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, a traditional mouse, a camera, a microphone, or other components by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned facial expression models 140. For example, the facial expression models 140 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, convolutional neural networks, or other forms of neural networks. Alternatively or additionally, the facial expression models 140 can include other forms of machine-learned models. Example facial expression models 140 and training schemes therefor are discussed with reference to FIGS. 2-5B.

The server computing system 130 can train the facial expression models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120/140 using various training or learning techniques, such as, for example, backwards propagation of errors. The model trainer 160 can perform a number of generalization techniques (e.g., weight decays, dropouts, etc.) to improve the generalization capability of the models being trained.

In particular, the model trainer 160 can train a facial expression model 120/140 based on a set of training data 162. Example types of training data and training schemes are discussed in further detail with reference to FIGS. 5A-B.

In some implementations, if the user has provided consent, the training examples can be provided by the user computing device 102. Thus, in such implementations, the model 120/140 provided to or used for the user computing device 102 can be trained by the training computing system 150 on user-specific data received from the user computing device 102. In some instances, this process can be referred to as personalizing the model. In addition, as described with reference to FIGS. 5-6, a specific classification model can be trained as well.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the facial expression models 120 can be both trained and used locally at the user computing device 102. In some of such implementations, the user computing device 102 can implement the model trainer 160 to personalize the facial expression models 120 based on user-specific data.

Figure 1B:
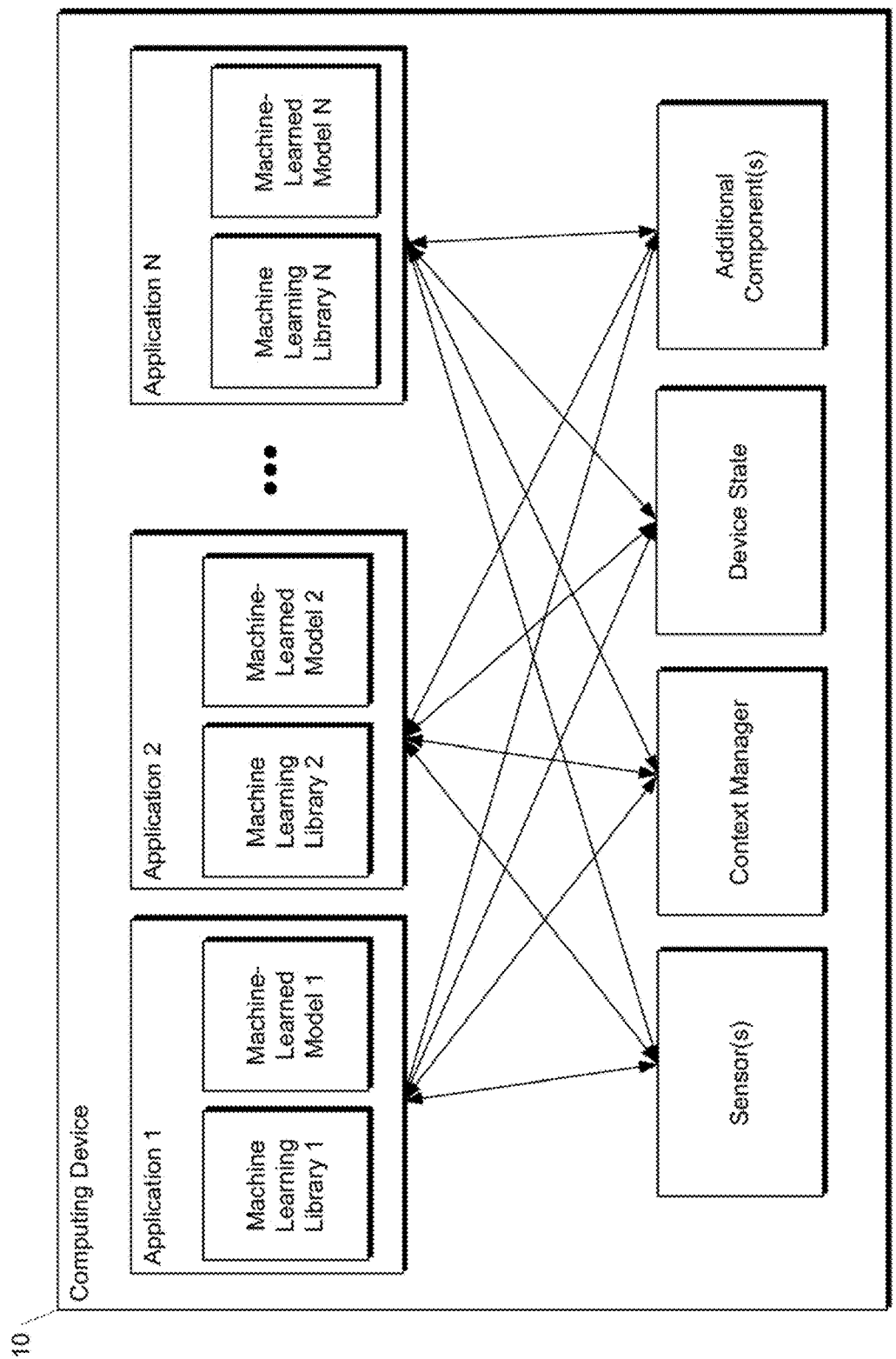
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned facial expression model. Example applications include an application that includes image and/or video search functionality, an image collection and/or management application, an emoji provisioning application, puppetry application, a face synthesization application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
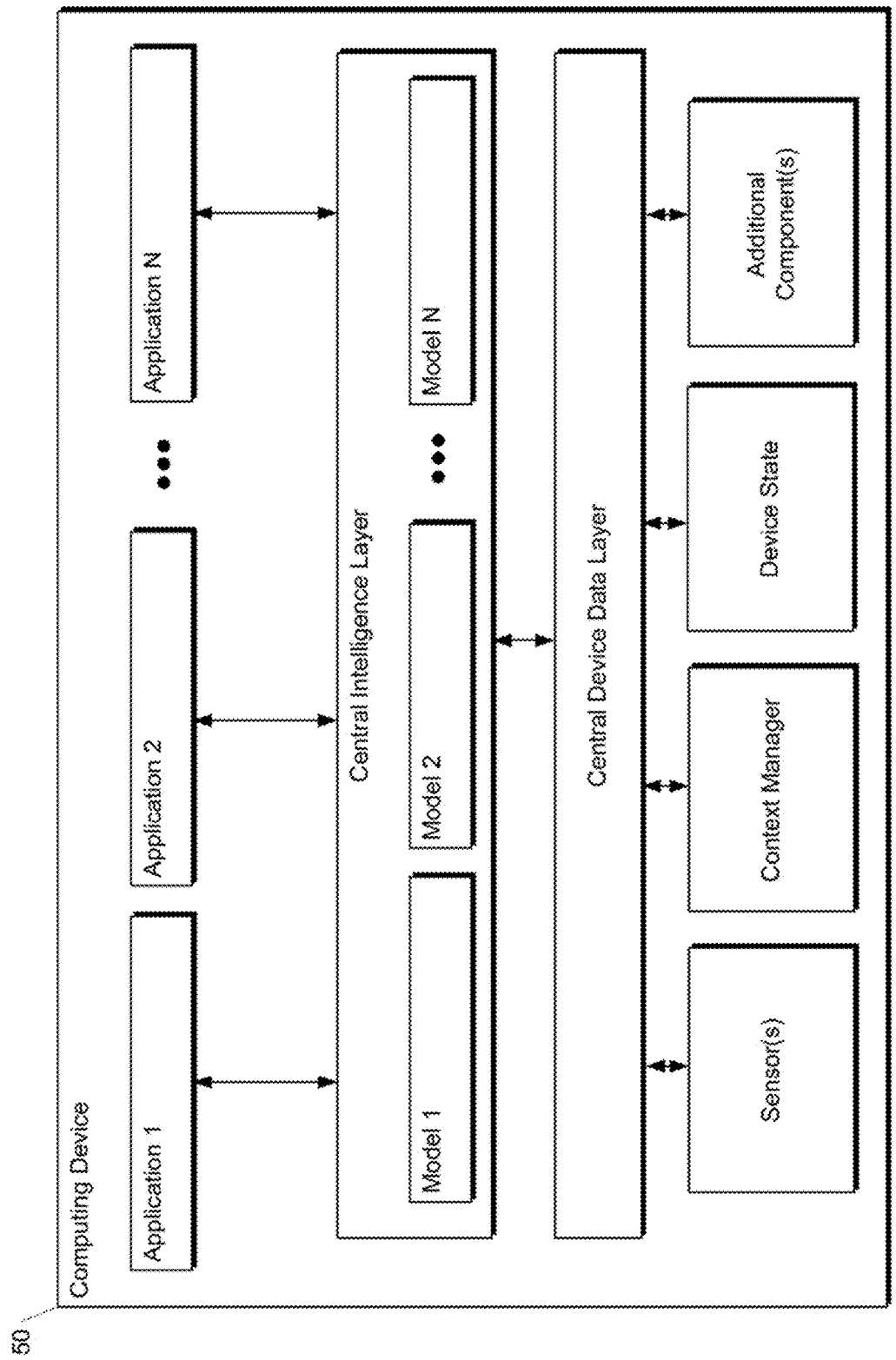
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include an application that includes image and/or video search functionality, an image collection and/or management application, an emoji provisioning application, puppetry application, a face synthesization application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a facial expression model) can be provided for each application and managed by the central intelligence layer. In other implementations, two or more applications can share a single machine-learned model. For example, in some implementations, the central intelligence layer can provide a single model (e.g., a single facial expression model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements and Training Schemes

Figure 2:
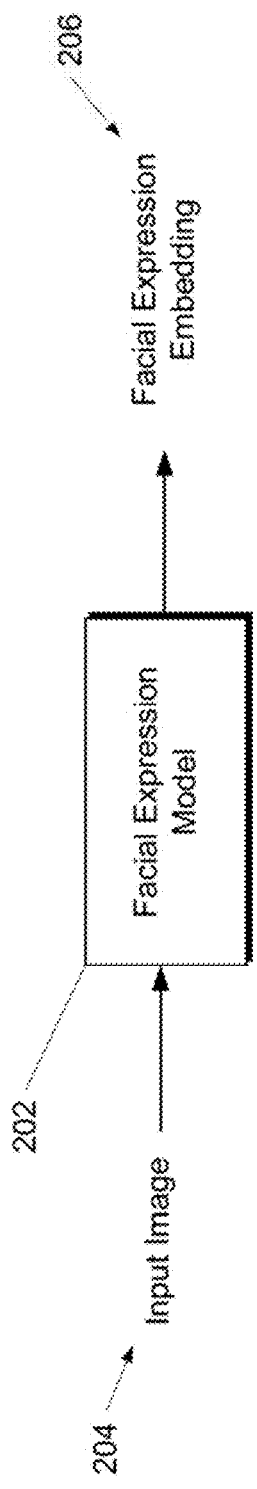
FIG. 2 depicts an example workflow according to example embodiments of the present disclosure.

FIG. 2 depicts an example workflow according to example embodiments of the present disclosure. In particular, FIG. 2 illustrates a facial expression model 202 that is configured to provide a facial expression embedding 206. In particular, the facial expression model 202 can receive an input image 204 that depicts a face and, in response, provide a facial expression embedding 206 that encodes information descriptive of a facial expression made by the face depicted in the input image 204.

In some implementations, the facial expression embedding 206 can be obtained from or otherwise provided at a final layer of the facial expression model 202. In other implementations, the facial expression embedding 206 can be obtained from or otherwise provided at an intermediate layer of the facial expression model 202. For example, the intermediate layer can be a close to final but not final layer of the facial expression model 202.

In some implementations, the facial expression model 202 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, convolutional neural networks, or other forms of neural networks. Alternatively or additionally, the facial expression model 202 can include other forms of machine-learned models.

According to an aspect of the present disclosure, in some implementations, the facial expression embedding 206 can be a language-free embedding. In particular, in some implementations, the facial expression embedding 206 can be or include an embedding vector that contains a plurality of numerical values respectively for a plurality of embedding dimensions (e.g., 16 embedding dimensions). Thus, the facial expression embedding 206 can provide a numerical encoding of facial expression information that does not rely upon human language concepts of facial expression (e.g., "smile," "frown," etc.) but instead lies within a continuous and universal numerical spectrum of embedding space.

As such, the facial expression embedding 206 resolves a common problem associated with classification of facial expressions based on language-based categories, which is the requirement of a priori agreement on a shared and inherently limiting dictionary of facial expression categories. Furthermore, due to the continuous nature of the embedding space, the facial expression model 202 and corresponding embeddings 206 can encode a much more complex and subtle understanding of the facial expression. As an example, the facial expression model 202 and corresponding embeddings 206 can differentiate between nuanced expressions such as a forced smile and a genuine smile. This continuous spectrum nature of the facial expression model 202 is also in contrast to facial recognition models which are inherently based on a number of discrete categories (e.g., identities).

The facial expression embedding 206 can be useful for a number of different uses, including, for example, determining a measure of similarity between two facial expressions made by different faces in respective images. In particular, a similarity between the respective facial expression embeddings can be indicative of a similarity between the respective facial expressions. Likewise, a dis-similarity between the embeddings can indicate a dis-similarity between the facial expressions. In one example, a similarity or relatedness between facial expressions can be determined by calculating a Euclidean distance (e.g., in a dimension-wise fashion) between their respective embedding vectors as provided by the facial expression model. Such can be useful for performing, among other applications, an expression similarity search.

In addition, the facial expression information encoded by the facial expression embedding 206 is generally abstracted or otherwise divorced from an identity of the person making the facial expression. Thus, expressions can be compared across different persons, irrespective of the identity of the person(s) making the expression. Such is in contrast to more commonly used facial recognition models (e.g., facial recognition neural networks) which focus on using embeddings to identify images of a same person, irrespective of facial expression.

Figure 3:
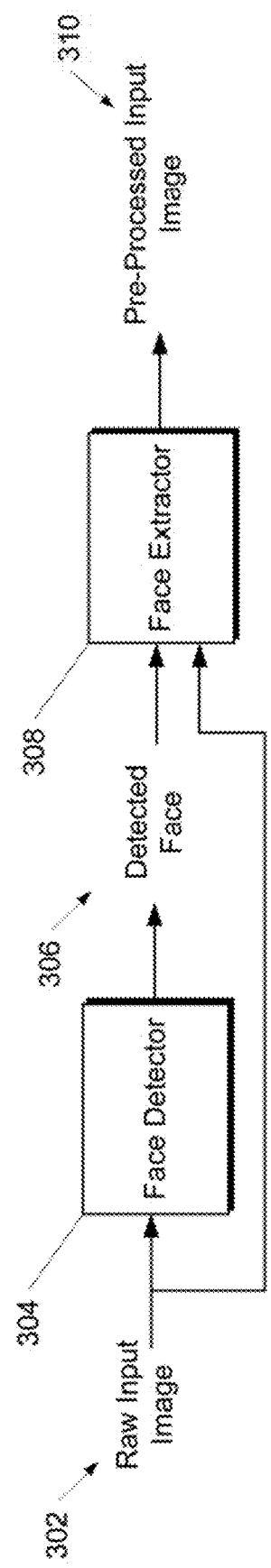
FIG. 3 depicts an example image preprocessing workflow according to example embodiments of the present disclosure.

FIG. 3 depicts an example image preprocessing workflow according to example embodiments of the present disclosure. FIG. 3 depicts one example preprocessing workflow. Other preprocessing workflows can be used (or not used) in addition or alternatively to the workflow illustrated in FIG. 3.

As depicted in FIG. 3, the example preprocessing workflow can include a face detector 304 and a face extractor 308. In particular, the face detector 304 can receive or otherwise obtain a raw input image 302. The face detector 304 can output a detected face 306. For example, the face detector 304 can provide an indication of one or more locations within the raw input image 302 at which one or more faces are depicted (e.g., in the form of a coordinate or a bounding box). As another example, the face detector 304 can crop the raw input image 302 to provide a cropped image that contains only the detected face 306.

More particularly, the face detector 304 can find human faces in photos. In some implementations, it can also find and track positions of facial landmarks such as the eyes, nose, and mouth. In some implementations, the face detector 304 can also describe one or more angles, poses, or orientations at which a face is oriented within the raw image 302.

In some implementations, the face detector 304 can be a neural network, such as, for example, a convolutional neural network. In some implementations, the face detector 304 can be provided or accessed via an application programming interface.

The face extractor 308 can receive the detected face 306 and also optionally the raw input image 302. The face extractor 308 can output a preprocessed input image 310. In some implementations, the preprocessed input image 310 can be used as the input image 204. In other implementations, the raw input image 302 can be used as the input image 204.

The face extractor 308 can generate the preprocessed input image 310 from the detected face 306 and/or the raw input image 302. For example, in some implementations, the face extractor 308 can generate the preprocessed input image 310 from the raw input image 302 based on location information provided by the face detector 304 for the detected face 306.

As one example, in some implementations, the preprocessed input image 310 can include a relatively larger bounding box than was provided for the detected face 306 by the face detector 304. As another example, in some implementations, the face extractor 308 can rotate the detected face 306 so that the detected face 306 is in-plane within the preprocessed input image 310. As yet another example, in some implementations the face extractor 308 can resize the extracted face and/or the detected face to a particular resolution, such as, for example, a 244×244 image.

Figure 4:
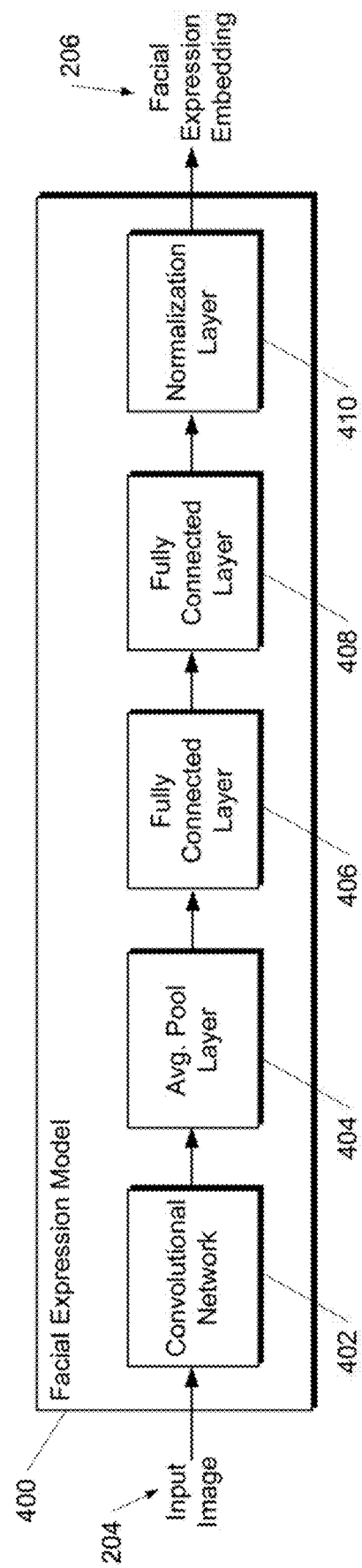
FIG. 4 depicts an example facial expression model according to example embodiments of the present disclosure.

FIG. 4 depicts an example facial expression model 400 according to example embodiments of the present disclosure. FIG. 4 depicts one example model structure. Other structures can be used in addition or alternatively to the structure illustrated in FIG. 4. The facial expression model 400 includes a convolutional network 402, an average pool layer 404, a first fully connected layer 406, a second fully connected layer 408, and a normalization layer 410.

The convolutional network 402 can include one or more convolutional layers. In one example, the convolutional network 402 can provide to the average pool layer 404 a 7×7×1024 feature map.

In some implementations, the convolutional network 402 and/or other portions of the facial expression model 400 can have been previously trained on other forms of data and can thereafter be repurposed or otherwise retrained for use within the facial expression model 400. As one example, the convolutional network 402 can be a retrained portion of the Facenet V8 model (e.g., up to the mixed 5a-0 layer). See, e.g., Schroff et al., FaceNet: A Unified Embedding for Face Recognition and Clustering. However, in other implementations, the convolutional network 402 can be trained from scratch (e.g., not repurposed from some other previously trained model).

In some implementations, as an example, the average pool layer 404 can provide the fully connected layer 406 with data in 1024 dimensions; the first fully connected layer 406 can provide the second fully connected layer 408 with data in 512 dimensions; and/or the second fully connected layer 408 can provide the normalization layer 410 with data in 16 dimensions. In some implementations, the normalization layer 410 can normalize the data received from the second fully connected layer 408 to a unit length.

As described above, in some implementations, the facial expression embedding 206 provided by the normalization layer 410 can be or include an embedding vector that contains a plurality of numerical values respectively for a plurality of embedding dimensions (e.g., 16 embedding dimensions).

Example Triplet Training Scheme

FIGS. 5A-B depict an example training scheme according to example embodiments of the present disclosure. More particularly, according to another aspect of the present disclosure, the facial expression model can be trained to provide facial expression embeddings that reflect or otherwise mimic human perception or opinions. For example, in some implementations, the facial expression model can be trained on training data that includes humanly applied labels, thereby providing embeddings that mimic or otherwise reflect human perceptions or opinions regarding facial expressions.

In particular, according to an aspect of the present disclosure, the facial expression model can be trained according to a triplet training scheme, in which triplets of images are used to train the model. In particular, as illustrated in FIG. 5A, the facial expression model 202 can be trained using a triplet-based objective function 502. For example, the triplet-based objective function 502 can be backpropagated through the facial expression model 202 to train the facial expression model 202.

More particularly, training models such as neural networks (e.g., convolutional neural networks) to perform face (or any other object) recognition can be performed by labelling images of a triplet of images. Specifically, in certain existing techniques one of the images is labelled as a reference image (also sometimes referred to as an anchor or query image) against which the other two images have been compared. The other two images are labelled as positive or negative, with a positive label indicating that the face/object in the image matches the face/object in the reference image and a negative label indicating that the face/object in the image does not match the face/object in the reference image.

Although this approach can be effective for identification of characteristics of a subject of an image which vary in a discrete manner, e.g., the identity or the type/class of the subject, it may be less effective when the characteristic does not vary discretely. Such non-discretely varying characteristics include facial expressions, which, since they may include many subtle differences, may not be easy to categorize into any one category. Furthermore, as is generally the case for all humanly-applied data labelling, collection of labels for the training data can require a significant expenditure of time and/or financial expense.

As such, according to another aspect of the present disclosure, the facial expression model can be trained using a novel and unique triplet training scheme which, in contrast to the triplet training schemes described immediately above, does not rely upon designation of a particular image as an anchor or reference image. Specifically, training data can include plural triplets of images and similarity information corresponding to each triplet. The similarity information can indicate which two images of the triplet have been determined to be the most similar pair of images. For example, the similarity information can include one or more labels that have been applied by human reviewers, where the one or more labels indicate which two images of the triplet the human reviewer believed to be most similar.

Unlike the above-described conventional approach, none of the images is indicated to be a reference image against which the other two images of the triplet have been compared. Instead, any two of the images of the triplet may have been determined to be the most similar. This is not the case in the conventional approach in which it is not possible for the two non-reference images to have been determined to be the most similar.

As an example, FIG. 5B illustrates a triplet of images that includes Image A, Image B, and Image C. Each of the Images A, B, and C depicts a respective face making a respective facial expression. As illustrated in FIG. 5B, a human reviewer can be instructed (e.g., through a textual prompt) to select the pair of images within the triplet that depict the most similar facial expressions. While this selection is based on the personal judgment of the human reviewer, one example judgment might select Images A and C as the pair of images that depict the most similar facial expressions.

Referring again to FIG. 5A, the facial expression model 202 is then trained using this training data. For example, according to another aspect of the present disclosure, in some implementations, the facial expression model can be trained such that a distance in the embedding space between the embeddings of the most similar pair of images is less than respective distances between the embeddings of each image of the pair and the third image of the triplet. In particular, in some implementations, the facial expression model can be trained such that the distance in the embedding space between the embeddings of the most similar pair of images is less than respective distances between the embeddings of each image of the pair and the third image of the triplet by at least a margin.

As an example of the above-described concept, in some implementations, the facial expression model can be trained using an objective function 502 that encodes both a first constraint and a second constraint. For each triplet of images, the first constraint can include a first requirement that a first distance between a first embedding provided for a first image of the pair of most similar images and a second embedding provided for a second image of the pair of most similar images is less than (e.g., by at least a first margin) a second distance between the first embedding and a third embedding provided by the facial expression model for a third image (e.g., the image not included in the pair of most similar images). Likewise, for each triplet of images, the second constraint can include a second requirement that the first distance between the first embedding and the second embedding is less than (e.g., by at least a second margin) a third distance between the second embedding provided for the second image by the facial expression model and the third embedding provided for the third image by the facial expression model. For example, each distance between embeddings can be a Euclidian distance between such embeddings. The first margin can be the same as or different than the second margin. The first margin and/or the second margin can be zero or can be non-zero (e.g., positive real number).

To provide one example, referring collectively to both FIGS. 5A and 5B, and assuming that Images A and C were selected as the pair of images that depicted the most similar facial expressions, then in such instance, the objective function 502 could encode a first constraint that the first distance between the respective embeddings of Image A and Image C is less than (e.g., by at least a first margin) a second distance between the respective embeddings of Image A and Image B. In addition to this first constraint, the objective function 502 could also encode a second constraint that the first distance between the respective embeddings of Image A and Image C is also less than (e.g., by at least a second margin) a third distance between the respective embeddings of Image C and Image B.

Since the similarity information indicates a most similar pair of images rather than whether or not a certain characteristic of an image is most similar to a characteristic of a reference image, non-discretely (or continuously) varying characteristics may be recognized more accurately. This may be at least in part because the similarity information may provide more information than is offered by the conventional labelling approach. This is because it indicates a) that a first image is most similar to a second image, b) that a third image is less similar to the first image than is the second image, and c) that the third image is less similar to the second image than is the first image. In contrast, the conventional labelling approach only indicates that the positive image is more similar to the reference image than is the negative image.

Thus, in effect, the novel anchor-free labelling scheme provided by the present disclosure provides two judgments for each triplet of images, while the more conventional labelling approach provides only a single judgment. Thus, the novel anchor-free labelling scheme described herein doubles the usefulness of each instance of humanly-performed labelling. Thus, the significant expenditure of time and/or financial expense associated with collection of humanly-applied labels can be reduced by half.

As such, in some implementations, the objective function can encode two constraints for each example triplet. However, in other implementations, the objective function may simply encode a single constraint and the two comparisons/judgments provided for each triplet may simply be viewed as two different training examples against which the single constraint can be applied. In this latter scenario, the usefulness of each instance of human-performed labeling is still doubled relative to the anchor technique.

In addition to the above, because there is no requirement for the image triplets to include two images that match and one which does not, the processing involved with selecting the image triplets may be reduced. For example, any three arbitrary images can be used to provide useful training information, while still reflecting human perceptions. Stated differently, using the conventional approach, an initial review would need to be performed to ensure that the anchor image was, in fact, included within the most similar pair of images. However, with the novel training scheme described herein, there is no requirement for this initial review, as the human labeler is free to select any two of the three images as the most similar pair. Thus, in this fashion, expenditure of time and/or financial expense can be further reduced.

Furthermore, because the image triplets may be uncategorized, the training method may be language independent, which may avoid any problems (e.g., increased error) associated with discrepancies between meanings of particular category labels in different languages.

In addition, although the novel triplet training technique described by the present disclosure is discussed with particular reference to a facial expression model, the triplet training technique described herein is more broadly applicable and is useful to train a model to provide an embedding that is descriptive of any number of different characteristics (e.g., beyond facial expressions) exhibited by any number of different types or mediums of input data (e.g., beyond imagery). Thus, the triplet training technique can be applied to any form of training data having any different attribute or characteristic to enable a model to provide a language-free embedding descriptive of such attribute or characteristic within a continuous embedding space. In addition, as recognized above, the triplet training technique described herein has particular applicability and usefulness when applied to characteristics or attributes which are continuous in nature.

To provide one example application of the novel triplet training technique beyond the context of facial expressions, human reviewers could be provided with triplets of sounds and requested to select the pair of sounds in each triplet that are most similar to each other. A sound embedding model can be trained—using the labelled triplets and/or the example objective functions described herein—to provide a language-free sound embedding descriptive of an input sound. Such sound embedding could be used for a number of different uses including, for example, to identify sounds that are similar (as evidenced by their similar embeddings) to the input sound. Sound is provided as one example characteristic only. Many other characteristics could be used, including, as examples, color, artwork, hairstyle, patterns, writing style, visual appearance of various types, operating parameters or status indicated by sensor data, etc.

Example Use Cases

FIG. 6 depicts an example use of a facial expression embedding according to example embodiments of the present disclosure. In particular, FIG. 6 illustrates a search tool 602 that receives the facial expression embedding 206 and uses the facial expression embedding 206 to identify one or more images 604 with similar facial expressions to the facial expression exhibited by the face depicted by the input image 204.

The search tool 602 can be any form of search engine or other search tool. As described above, in some implementations, the search tool 602 can identify the images 604 with similar expressions by determining a distance between the facial expression embedding 206 and respective embeddings respectively associated with the images 604. For example, a relatively smaller Euclidean distance between embeddings can indicate that images include relatively more similar expressions.

Figure 14:
FIG. 14 depicts example facial expression embedding-based search results according to example embodiments of the present disclosure.

As one example, FIG. 14 depicts example facial expression embedding-based search results according to example embodiments of the present disclosure. In particular, FIG. 14 shows some example expression retrieval results. FIG. 14 includes 3 rows. In each row, the leftmost image is the query (e.g., the input image) and the remaining images within the row are the five closest images from a database of 155,000 celebrity photos.

Thus, a user can search photograph databases for particular expressions using the example workflow shown in FIG. 6. The database of photographs could be the user's own personal photographs or online photos.

In another example, an image or photographic management application could enable a user to make a facial expression in a camera or otherwise provide an input image that depicts a particular expression and then, in response, show all the images (e.g., within the user's photograph collection) that depict a face with the same or similar facial expression.

FIG. 7 depicts an example use of a facial expression embedding according to example embodiments of the present disclosure. In particular, FIG. 7 illustrates an emoji selector 702 that can select an emoji 704 based on a facial expression embedding 206.

The emoji selector 702 can identify, based at least in part on the facial expression embedding 206, an emoji 704 that has an emoji expression that is most similar to the facial expression made by the face depicted by the input image 204.

In some implementations, the emoji selector 702 can be a classification model such as, for example, a machine-learned classification model. For example, the classification model can be trained to receive the embedding 206 and, in response, output a selected emoji 704 based on training data that includes embeddings labeled with a "correct" emoji. For example, the classification model can be a neural network, a support vector machine, a decision tree, or other forms of classifiers.

In other implementations, the emoji selector 702 can be a lookup table. For example, ranges or sets of embeddings can have previously been mapped to particular emojis and the lookup table can provide and/or leverage such mappings.

As yet another example, a plurality of candidate emojis can respectively have a plurality of embeddings respectively associated therewith. In such implementations, the emoji selector 702 can determine a respective distance from the facial expression embedding 206 to the respective embedding for each emoji. The respective emoji that has the smallest distance from its embedding to the facial expression embedding 206 can be selected by the selector 702 as the selected emoji 704. In this way, the emoji selector 702 can operate in a similar fashion to the search tool 602.

In one example application of the emoji selector 702, an emoji selection application could enable a user to make a facial expression in the camera or otherwise provide an input image that depicts a particular facial expression and then, in response, provide one or more emojis with the same facial expression. The emoji(s) could be generic or personalized. The emoji(s) could be used in a messaging application.

Emojis are used as one example only. Techniques described herein are equally applicable to other representations of faces (e.g., realistic facial renderings) in addition to emojis.

Figure 8:
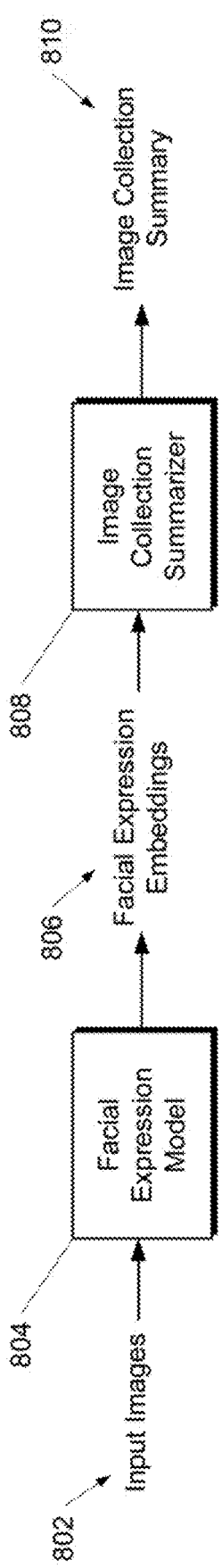
FIG. 8 depicts an example use of a facial expression embedding according to example embodiments of the present disclosure.

FIG. 8 depicts an example use of a facial expression embedding according to example embodiments of the present disclosure. In particular, FIG. 8 shows use of a plurality of facial expression embeddings 806 respectively obtained for a plurality of input images 802 for image collection summarization.

More particularly, the plurality of input images 802 can be respectively input into a facial expression model 804 to respectively receive a plurality of facial expression embeddings 806. An image collection summarizer 808 can use the embeddings 806 to generate an image collection summary 810. For example, the image collection summary 810 can include images clustered according to facial expressions depicted by such images. Thus, facial expression embeddings 806 can be used to cluster images in a collection into clusters according to facial expression similarity.

Figure 9:
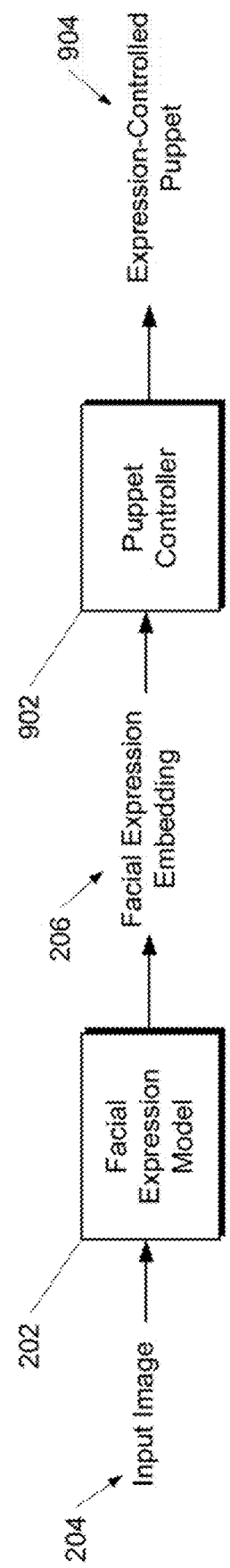
FIG. 9 depicts an example use of a facial expression embedding according to example embodiments of the present disclosure.

FIG. 9 depicts an example use of a facial expression embedding according to example embodiments of the present disclosure. In particular, FIG. 9 illustrates a puppet controller 902 that uses a facial expression embedding 206 to control an expression-controlled puppet 904. For example, in some implementations, the puppet 904 can be controlled to have a same facial expression as is depicted in the input image 204. For example, the input image 204 can be an image of a user as captured contemporaneously by a camera.

In some implementations, the puppet controller 902 can operate in a similar fashion to the emoji selector 702 discussed with reference to FIG. 7. For example, the puppet controller 902 can include or leverage a classifier, a lookup table, or other cluster or search tools to identify an appropriate puppet expression that matches an expression depicted by the input image 204 (which may be, for example, a contemporaneously captured image of the user).

As one example, the puppet 904 can be an avatar or other graphical and/or virtual rendering of a user. Thus, in one example, the puppet controller 902 can be used to control an avatar of a user within a virtual reality environment (e.g., to control the avatar to have a same facial expression as the user as the user's facial expression changes over time).

In other implementations, some other mapping between facial expressions and puppet actions can be used that does not necessarily simply re-create the facial expression depicted by the input image 204. For example, a predefined mapping might translate from an embedding 206 descriptive of a smile included in the input image 204 to a dancing action by the puppet 904. Likewise, the mapping might translate from an embedding 206 descriptive of a frown included in the input image 204 to a crying action by the puppet 904. Many different and arbitrary mappings can be used.

Figure 10:
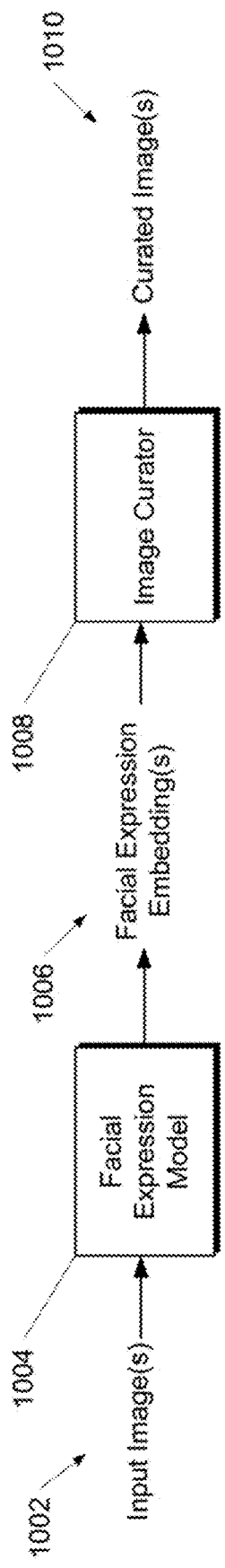
FIG. 10 depicts an example use of a facial expression embedding according to example embodiments of the present disclosure.

FIG. 10 depicts an example use of a facial expression embedding according to example embodiments of the present disclosure. In particular, FIG. 10 illustrates an image curator 1008 that uses facial expression embeddings 1006 respectively provided for input images 1002 by the facial expression model 1004 to provide curated images 1010.

In one example, the image curator 1008 can determine a score for an input image based at least in part on the facial expression embedding provided for such input image. The image curator 1008 can determine an action to be taken on the image based at least in part on its score.

In one example, the image curator 1008 can select the input image as a best shot from a group of images based at least in part on the score determined for the input image relative to other scores determined for that the group of images. Thus, for example, a score can be determined for each collected image based at least in part on its facial expression embedding. A best shot from a group of images can be identified based on its score (e.g., based on having a largest score in the group).

In another example, the image curator 1008 can determine, based at least in part on a score determined for an input image, whether to store a non-temporary copy of the input image or to discard a temporary copy of the input image without storing the non-temporary copy of the input image. Thus, for example, a score can be determined for each collected image based at least in part on its facial expression embedding. The image curator 1008 can determine whether to store the input image or to discard the input image without storage based at least in part on its score. Such may be applicable in "always-on" cameras that have limited storage space.

Other image curation tasks can be performed as well. In particular, the embedding can be used as a feature in training other algorithms (e.g., curation algorithms that select the best photos from a photo burst, identify interesting moments captured by devices, etc.). In some implementations the image curator 1008 can be or include a neural network.

Figure 11:
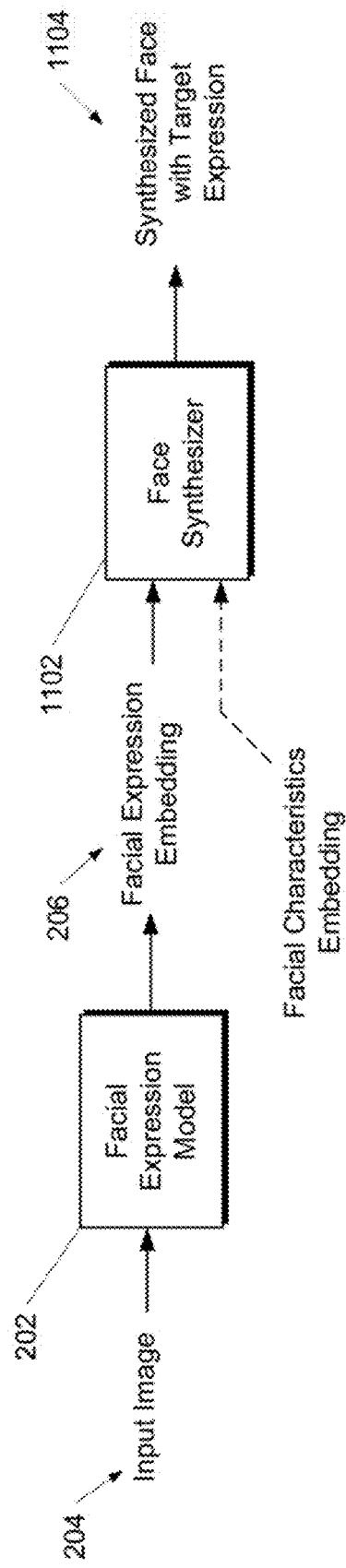
FIG. 11 depicts an example use of a facial expression embedding according to example embodiments of the present disclosure.

FIG. 11 depicts an example use of a facial expression embedding according to example embodiments of the present disclosure. In particular, FIG. 11 illustrates a face synthesizer 1102 that can generate a synthesized face 1104 (e.g., an image of a synthesized face) based at least in part on the facial expression embedding 206. In particular, the face synthesizer 1102 can generate the synthesized face 1104 that has the same facial expression as depicted in the input image 204.

In some implementations, the face synthesizer 1102 can also receive a facial characteristics embedding 1106 or other facial characteristics information. For example, the facial characteristics embedding 1106 can be provided by a facial recognition model.

The face synthesizer 1102 can use the facial characteristics information 1106 and the facial expression embedding 206 to generate the synthesized face 1104 that has the target facial expression and also has facial characteristics that are described by the facial characteristics information 1106.

In some implementations, the face synthesizer 1102 can be neural network. For example, in some implementations, the face synthesizer 1102 can be an autoencoder such as, for example, a generative autoencoder.

Thus, the expression embedding 206 can be used as an input to a neural network along with facial characteristics embedding given by a facial recognition network to synthesize a face image of a particular subject with a target expression.

Example Methods

Figure 12:
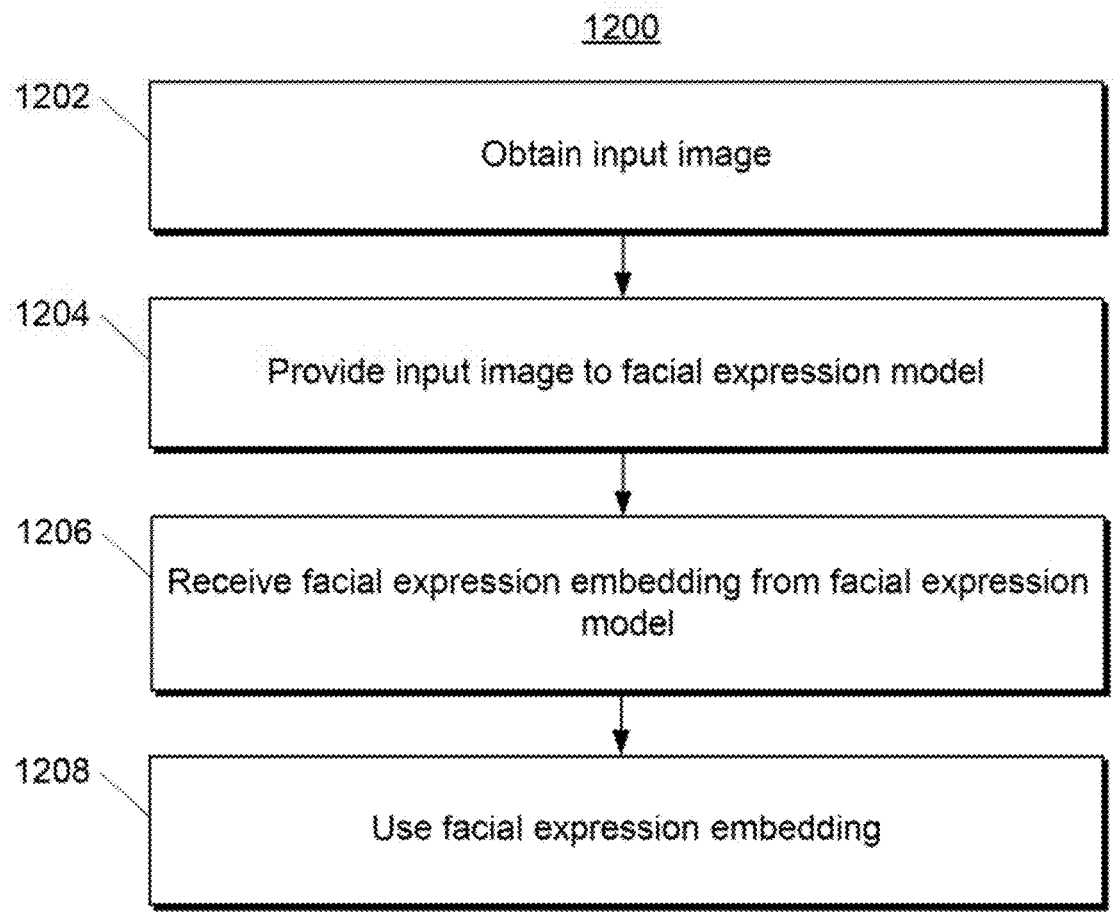
FIG. 12 depicts a flow chart diagram of an example method to obtain a facial expression embedding according to example embodiments of the present disclosure.

FIG. 12 depicts a flow chart diagram of an example method 1200 to obtain a facial expression embedding according to example embodiments of the present disclosure.

At 1202, a computing system obtains an input image. The input image can depict a face that is making a facial expression.

At 1204, the computing system provides the input image to a facial expression model. At 1206, the computing system receives a facial expression embedding from the facial expression model. The facial expression embedding encodes information descriptive of the facial expression made by the face depicted in the input image.

At 1208, the computing system uses the facial expression embedding. Example uses of the facial expression embedding are described above with reference to FIGS. 6 through 11 and elsewhere.

Figure 13:
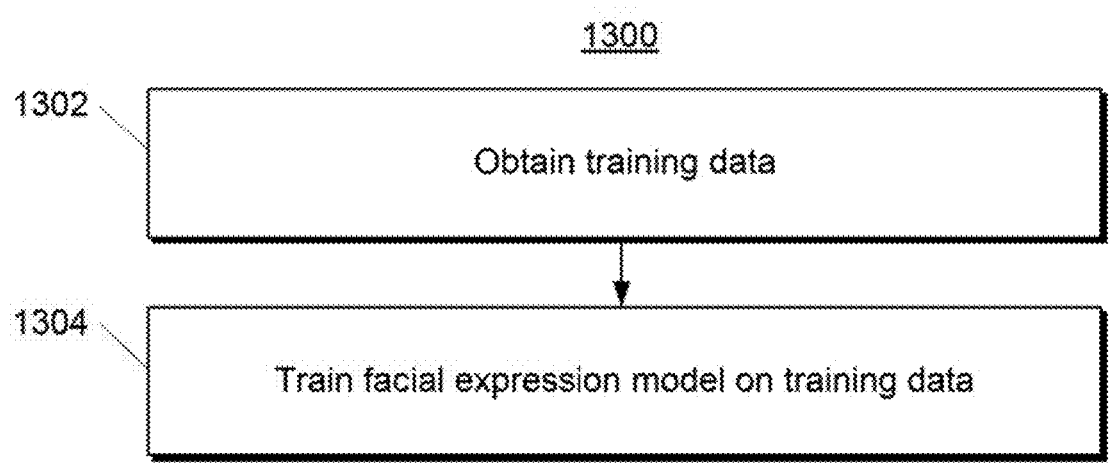
FIG. 13 depicts a flow chart diagram of an example method to train a facial expression model according to example embodiments of the present disclosure.

FIG. 13 depicts a flow chart diagram of an example method 1300 to train a facial expression model according to example embodiments of the present disclosure.

At 1302, a computing system obtains training data. For example, the training data can include a plurality of images organized into triplets of images. Each triplet of images can include similarity information such as, for example, a label, that indicates which two of the three images included in such triplet of images have been assessed to be a most similar pair of images within such triplet of images.

In particular, according to an aspect of the present disclosure, in some implementations, none of the three images has been indicated to be a reference image or an anchor image that is required to be included within the most similar pair of images.

At 1304, the computing system trains a facial expression model on the training data. For example, the facial expression model can be trained using a triplet-based objective function. For example the objective function can be back-propagated through the facial expression model to train the facial expression model. However, other training techniques can be performed in addition or alternatively to backpropagation.

In particular, in some implementations, the objective function can encode both a first constraint and a second constraint. The first constraint can include a first requirement that a first distance between the embeddings provided for the pair of most similar images is smaller than a second distance between the embeddings provided for a first image of the pair and the third image of the triplet that is not included in the pair. The second constraint can include a second requirement that the first distance between the embeddings provided for the pair of most similar images is smaller than a third distance between the embeddings provided for a second image of the pair and the third image of the triplet that is not included in the pair.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Each of the face extractor 308, the search tool 602, the emoji selector 702, the image collection summarizer 808, the puppet controller 902, the image curator 1008, and the face synthesizer 1102 includes computer logic utilized to provide desired functionality. Each of the face extractor 308, the search tool 602, the emoji selector 702, the image collection summarizer 808, the puppet controller 902, the image curator 1008, and the face synthesizer 1102 can be implemented in hardware, firmware, and/or software controlling a general purpose processor. For example, in some implementations, each of the face extractor 308, the search tool 602, the emoji selector 702, the image collection summarizer 808, the puppet controller 902, the image curator 1008, and the face synthesizer 1102 includes program files stored on a storage device, loaded into a memory and executed by one or more processors. In other implementations, each of the face extractor 308, the search tool 602, the emoji selector 702, the image collection summarizer 808, the puppet controller 902, the image curator 1008, and the face synthesizer 1102 includes one or more sets of computer-executable instructions that are stored in a tangible computer-readable storage medium such as RAM hard disk or optical or magnetic media.

What is claimed is:

1. A computer system, the computer system comprising:
a machine-learned model configured to receive an input and, in response, provide an embedding that encodes information descriptive of the input;
one or more processors; and
one or more non-transitory computer-readable media that store instructions that, when executed by the one or more processors, cause the computer system to:
obtain the input;
provide the input to the machine-learned model; and
receive, as an output of the machine-learned model, the embedding that encodes information descriptive of the input;
wherein the machine-learned model has been trained on a training dataset that comprises a plurality of training inputs organized into triplets of training inputs;
wherein each triplet of training inputs comprises a label that indicates which two of three training inputs included in such triplet of training inputs have been assessed to be a most similar pair of training inputs within such triplet of training inputs;
wherein each triplet of training inputs comprises a first training input, a second training input, and a third training input, wherein the first training input and the second training input have been assessed to be the most similar pair of training inputs within the triplet of training inputs;
wherein the machine-learned model has been trained with an objective function that encodes both a first constraint and a second constraint;
wherein the first constraint comprises a first requirement that a first distance between a first embedding provided for the first training input by the machine-learned model and a second embedding provided for the second training input by the machine-learned model is less than a second distance between the first embedding and a third embedding provided for the third training input by the machine-learned model; and
wherein the second constraint comprises a second requirement that the first distance between the first embedding and the second embedding is less than a third distance between the second embedding provided for the second training input by the machine-learned model and the third embedding provided for the third training input by the machine-learned model.

2. The computer system of claim 1, wherein, for each triplet of training inputs, none of the three training inputs is indicated to be an anchor training input.

3. The computer system of claim 1, wherein the machine-learned model comprises a convolutional neural network.

4. The computer system of claim 1, wherein the embedding comprises a language-free embedding.

5. The computer system of claim 4, wherein none of the training inputs have been labelled with a language-based category label.

6. The computer system of claim 1, wherein execution of the instructions further causes the computer system to:
identify, as a search result in response to a search query associated with the input and based at least in part on the embedding, at least one additional input, wherein to identify the at least one additional input as the search result the computer system compares the embedding associated with the input to a plurality of additional embeddings respectively associated with a plurality of candidate inputs that are potential search results.

7. The computer system of claim 1, wherein the input comprises an image, the machine-learned model comprises a machine-learned image processing model, the embedding output by the machine-learned image processing model encodes information descriptive of the image, and each of the training inputs comprises a training image.

8. The computer system of claim 1, wherein the input comprises an image that depicts an object, the machine-learned model comprises a machine-learned object recognition model, the embedding output by the machine-learned object recognition model encodes information descriptive of the object depicted by the image, and each of the training inputs comprises a training image that depicts a training object.

9. The computer system of claim 1, wherein the input comprises a facial image that depicts a face, the embedding output by the machine-learned model encodes information descriptive of the face depicted by the facial image, and each of the training inputs comprises a training facial image that depicts a training face.

10. The computer system of claim 9, wherein the facial image depicts the face that has a facial expression, and the machine-learned model comprises a machine-learned facial expression model configured to generate the embedding that encodes information about the facial expression of the face.

11. The computer system of claim 10, wherein the machine-learned model comprises a machine-learned facial recognition model.

12. The computer system of claim 1, wherein the embedding encodes information descriptive of a characteristic of the input that is continuously valued.

13. One or more non-transitory computer-readable media that collectively store instructions that, when executed by one or more processors, cause the one or more processors to perform operations comprising:
training a machine-learned model to provide language-free embeddings descriptive of inputs, wherein training the machine-learned model comprises:
obtaining a training dataset that comprises a plurality of training inputs organized into triplets of training inputs, wherein each triplet of training inputs comprises a label that indicates that a first training input and a second training input included in such triplet of training inputs have been assessed to be a most similar pair of training inputs within such triplet of training inputs; and
training the machine-learned model using an objective function that encodes both a first constraint and a second constraint;
wherein, for each triplet of training inputs, the first constraint comprises a first requirement that a first distance between a first embedding provided for the first training input by the machine-learned model and a second embedding provided for the second training input by the machine-learned model is less than a second distance between the first embedding and a third embedding provided by the machine-learned model for a third training input included in such triplet of training inputs; and
wherein, for each triplet of training inputs, the second constraint comprises a second requirement that the first distance between the first embedding and the second embedding is less than a third distance between the second embedding provided for the second training input by the machine-learned model and the third embedding provided for the third training input by the machine-learned model.

14. The one or more non-transitory computer-readable media of claim 13, wherein, for each triplet of training inputs, none of the training inputs is indicated to be an anchor training input.

15. The one or more non-transitory computer-readable media of claim 13, wherein none of the training inputs have been labelled with a language-based category label.

16. The one or more non-transitory computer-readable media of claim 13, wherein the operations further comprise:
identifying, as a search result in response to a search query associated with the input and based at least in part on the embedding, at least one additional input, wherein identifying the at least one additional input as the search result comprising comparing the embedding associated with the input to a plurality of additional embeddings respectively associated with a plurality of candidate inputs that are potential search results.

17. The one or more non-transitory computer-readable media of claim 13, wherein each training input comprises a training image, the machine-learned model comprises a machine-learned image processing model, and each embedding output by the machine-learned image processing model encodes information descriptive of the corresponding training image.

18. The one or more non-transitory computer-readable media of claim 13, wherein each training input comprises a training image that depicts an object, the machine-learned model comprises a machine-learned object recognition model, and each embedding output by the machine-learned object recognition model encodes information descriptive of the object depicted by the corresponding training image.

19. The one or more non-transitory computer-readable media of claim 13, wherein each training input comprises a training image that depicts a face, and each embedding output by the machine-learned model encodes information descriptive of the face depicted by the corresponding training image.

20. The one or more non-transitory computer-readable media of claim 13, wherein each embedding encodes information descriptive of a characteristic of the corresponding training input that is continuously valued.

* * * * *